(12) United States Patent
Kunkes et al.

(10) Patent No.: US 11,021,372 B2
(45) Date of Patent: Jun. 1, 2021

(54) ALUMINUM GRADIENT ALUMINOSILICATE ZEOLITE COMPOSITIONS

(71) Applicant: BASF Corporation, Florham Park, NJ (US)

(72) Inventors: Eduard L Kunkes, New Brunswick, NJ (US); Ahmad Moini, Princeton, NJ (US); Martitza I. Ortega, Paterson, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 16/372,801

(22) Filed: Apr. 2, 2019

(65) Prior Publication Data

US 2019/0225500 A1    Jul. 25, 2019

Related U.S. Application Data

(63) Continuation of application No. PCT/IB2017/056073, filed on Oct. 2, 2017.

(60) Provisional application No. 62/403,331, filed on Oct. 3, 2016.

(51) Int. Cl.

| | |
|---|---|
| *B01J 29/06* | (2006.01) |
| *C01B 39/48* | (2006.01) |
| *B01J 29/50* | (2006.01) |
| *B01J 29/70* | (2006.01) |
| *B01J 35/10* | (2006.01) |
| *B01J 37/00* | (2006.01) |
| *B01J 37/10* | (2006.01) |
| *C01B 39/04* | (2006.01) |
| *C01B 39/30* | (2006.01) |
| *B01J 37/04* | (2006.01) |

(52) U.S. Cl.
CPC ............. *C01B 39/48* (2013.01); *B01J 29/50* (2013.01); *B01J 29/70* (2013.01); *B01J 29/7015* (2013.01); *B01J 35/1019* (2013.01); *B01J 37/0018* (2013.01); *B01J 37/04* (2013.01); *B01J 37/10* (2013.01); *C01B 39/04* (2013.01); *C01B 39/30* (2013.01); *C01P 2002/85* (2013.01); *C01P 2004/03* (2013.01); *C01P 2006/12* (2013.01)

(58) Field of Classification Search
CPC ........ B01J 29/50; B01J 29/70; B01J 29/7015; B01J 35/1019; B01J 37/04; B01J 37/10; B01J 29/7019; B01J 2229/12; B01J 2229/123; C01B 39/04; C01B 39/30; C01B 39/48
USPC .......................................... 502/60
See application file for complete search history.

(56) References Cited

U.S. PATENT DOCUMENTS

| | | | |
|---|---|---|---|
| 2002/0082460 A1* | 6/2002 | Verduijn | B01J 29/80 585/475 |
| 2003/0121827 A1* | 7/2003 | van den Berge | B01J 29/80 208/120.01 |
| 2011/0009682 A1* | 1/2011 | Matsushita | B01J 29/005 585/321 |
| 2013/0052125 A1 | 2/2013 | Moini et al. | |
| 2013/0072736 A1 | 3/2013 | Nakaoka et al. | |
| 2015/0190791 A1 | 7/2015 | Fedeyko et al. | |
| 2015/0343375 A1 | 12/2015 | Moini et al. | |
| 2015/0352538 A1 | 12/2015 | Schoenfeldt et al. | |
| 2015/0367337 A1 | 12/2015 | Yang et al. | |
| 2016/0229700 A1* | 8/2016 | Liu | B01J 29/084 |

FOREIGN PATENT DOCUMENTS

| | | |
|---|---|---|
| WO | WO 2013/038372 A2 | 3/2013 |
| WO | WO 2014/092870 A1 | 6/2014 |

OTHER PUBLICATIONS

Bouizi et al., "Factors Controlling the Formation of Core-Shell Zeolite-Zeolite Composites," Chem. of Materials, vol. 18, No. 20, pp. 4959-4966 (2006).

* cited by examiner

*Primary Examiner* — Elizabeth D Wood
(74) *Attorney, Agent, or Firm* — Finnegan, Henderson, Farabow, Garrett & Dunner L.L.P.

(57) ABSTRACT

Disclosed herein are compositions including aluminosilicate zeolite crystals with an 8 ring pore size having a depth dependent silica to alumina molar ratio and processes of making aluminosilicate zeolite crystals with an 8 ring pore size having a depth dependent silica to alumina molar ratio.

42 Claims, 3 Drawing Sheets

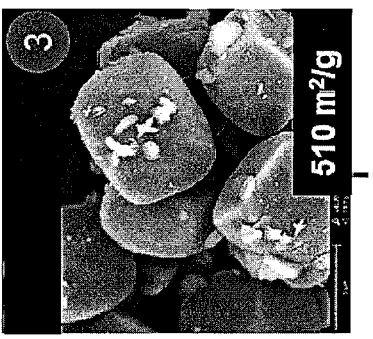
FIGURE 2D
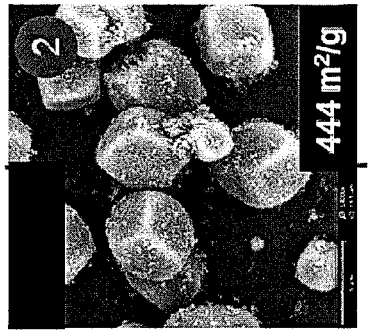
FIGURE 2C
FIGURE 2B
FIGURE 2A
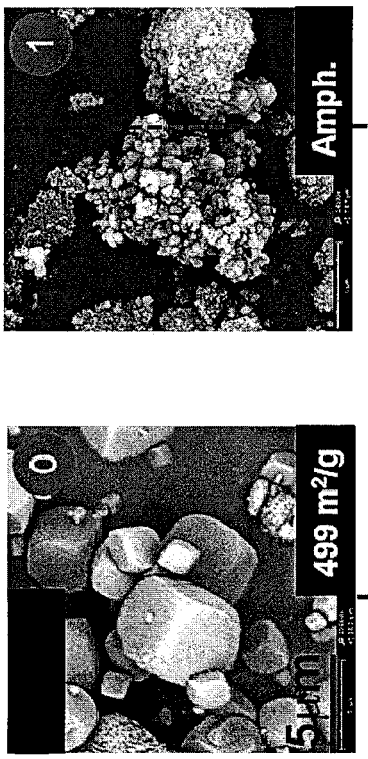
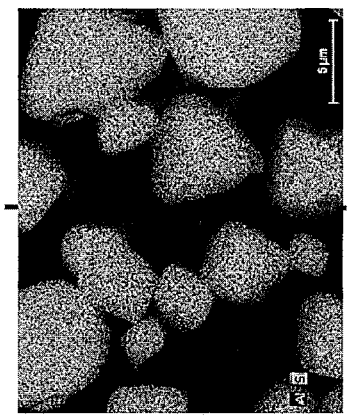
FIGURE 2G
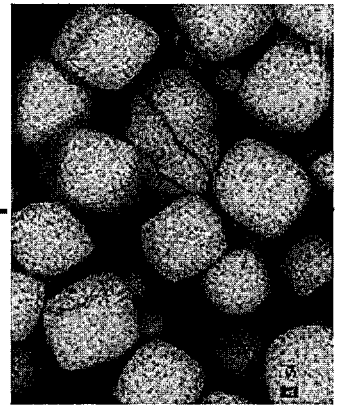
FIGURE 2F
FIGURE 2E
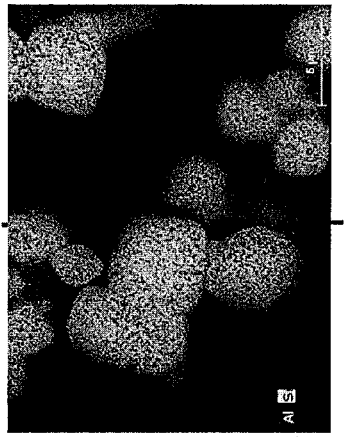

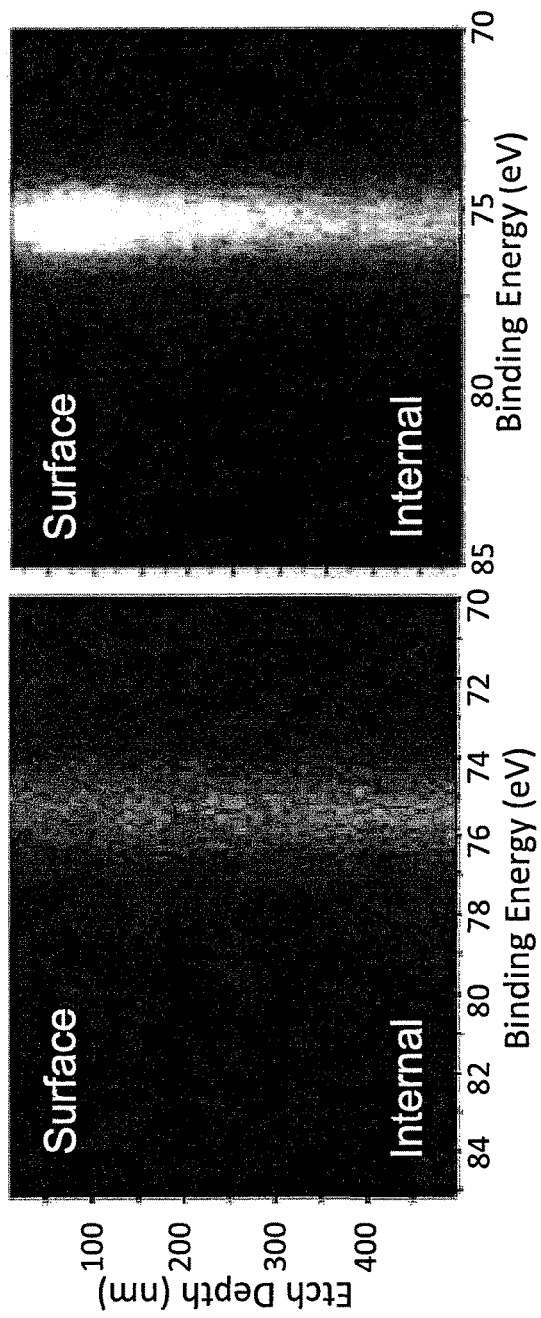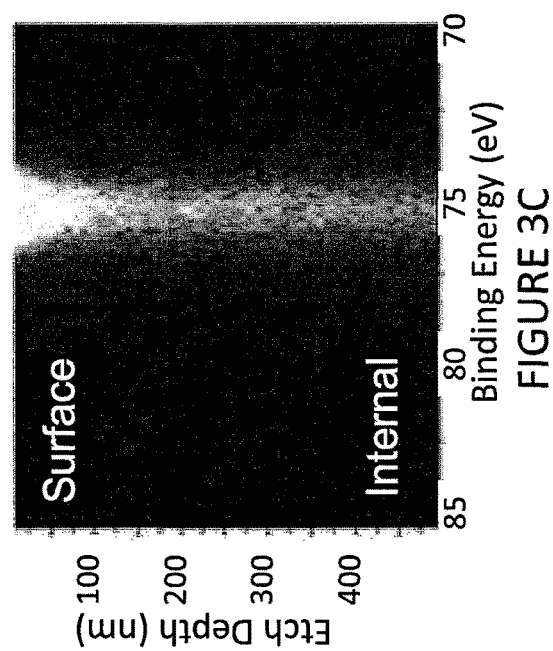

ALUMINUM GRADIENT ALUMINOSILICATE ZEOLITE COMPOSITIONS

CROSS-REFERENCE TO RELATED APPLICATIONS

This application is a continuation of International Application No. PCT/IB2017/056073, filed Oct. 2, 2017, which International Application was published by the International Bureau in English on Apr. 12, 2018, and which claims priority to U.S. Provisional Application No. 62/403,331, filed on Oct. 3, 2016, the content of each of which is hereby incorporated by reference in their entirety.

TECHNICAL FIELD

The present disclosure relates to aluminosilicate zeolite crystal compositions and processes for preparing said compositions. More particularly, the disclosure relates to an aluminosilicate zeolite crystal having a depth dependent silica to alumina molar ratio and processes of making an aluminosilicate zeolite crystal with a depth dependent silica to alumina molar ratio.

BACKGROUND

Crystalline aluminosilicate zeolite materials are widely used and have various applications. The standard industrial process for producing crystalline aluminosilicate zeolite materials involves the preparation of a gel composed of a source of silica, a source of alumina, mineralizing agent (e.g., base), and an organic structure directing agent (template). The crystallization of the gel occurs in a pressure vessel under hydrothermal conditions in batch mode. Under this standard industrial process, modification of the product properties stem from modifications to the original gel or to the synthesis conditions.

There is a need in the art to develop synthesis approaches that will enable controlled modification of the aluminum distribution in crystalline aluminosilicate zeolite materials.

SUMMARY

Disclosed herein are aluminosilicate zeolite crystal compositions and processes for preparing said aluminosilicate zeolite crystal compositions.

In some embodiments, the composition comprises an aluminosilicate zeolite crystal with an 8 ring pore size, the aluminosilicate zeolite crystal having a depth dependent silica to alumina molar ratio. In some embodiments, the aluminosilicate zeolite crystal has a surface silica to alumina molar ratio and an internal silica to alumina molar ratio, wherein the surface silica to alumina molar ratio is either higher or lower than the internal silica to alumina molar ratio. In certain advantageous embodiments, the surface silica to alumina molar ratio is lower than the internal silica to alumina molar ratio.

In some embodiments, the process for preparing the aluminosilicate zeolite crystal composition disclosed herein comprises mixing a first amount of a first alumina source, a silica source, a mineralizing agent, and an organic structure directing agent (template) to form a starting gel. The process may further comprise crystallizing the starting gel in a pressure vessel under hydrothermal conditions for a first duration. The process may further comprise adding a second amount of a second alumina source to the pressure vessel over a second duration, under hydrothermal conditions, to form a final crystallization product. The final crystallization product may optionally undergo further processing, such as filtering, drying, and calcining to form the final aluminosilicate zeolite crystals.

The present disclosure includes, without limitation, the following embodiments.

Embodiment 1

A composition comprising: an aluminosilicate zeolite crystal with an 8 ring pore size, the aluminosilicate zeolite crystal having a surface silica to alumina molar ratio and an internal silica to alumina molar ratio, wherein the surface silica to alumina molar ratio is either higher or lower than the internal silica to alumina molar ratio.

Embodiment 2

The composition of any preceding embodiment, wherein the aluminosilicate zeolite crystal comprises structural codes selected from the group consisting of AEI, AFX, CHA, LEV, AFT, EAB, KFI, SAT, TSC, SAV, ERI, and combinations thereof.

Embodiment 3

The composition of any preceding embodiment, wherein the aluminosilicate zeolite crystal comprises CHA.

Embodiment 4

The composition of any preceding embodiment, wherein the composition is about 80% or more crystalline on a molar basis.

Embodiment 5

The composition of any preceding embodiment, wherein the composition is about 80% to about 95% crystalline on a molar basis.

Embodiment 6

The composition of any preceding embodiment, wherein the composition has a zeolitic BET surface area of about 400 $m^2/g$ or more.

Embodiment 7

The composition of any preceding embodiment, wherein the surface silica to alumina molar ratio is one or more of the following: at least about 50 times higher or lower than the maximum value of the internal silica to alumina molar ratio; at least about 30 times higher or lower than the maximum value of the internal silica to alumina molar ratio; at least about 10 times higher or lower than the maximum value of the internal silica to alumina molar ratio; at least about 5 times higher or lower than the maximum value of the internal silica to alumina molar ratio; and at least about 1.5 times higher or lower than the maximum value of the internal silica to alumina molar ratio. Advantageously, in certain embodiments, the surface silica to alumina molar ratio is lower by any of the amounts noted above.

Embodiment 8

The composition of any preceding embodiment, wherein the internal silica to alumina molar ratio has a maximum value ranging from about 10 to about 250, or about 50 to about 250, or about 90 to about 250, or about 150 to about 250.

Embodiment 9

The composition of any preceding embodiment, wherein the surface silica to alumina molar ratio ranges from about 5 to about 60, or about 10 to about 50, or from about 15 to about 40, or about 20 to about 40.

Embodiment 10

The composition of any preceding embodiment, wherein the composition has, on a molar basis, about 5% or more aluminum enrichment on a surface of the aluminosilicate zeolite crystal relative to the center of the aluminosilicate zeolite crystal; or about 10% or more aluminum enrichment on the surface of the aluminosilicate zeolite crystal relative to the center of the aluminosilicate zeolite crystal; or about 15% or more aluminum enrichment on the surface of the aluminosilicate zeolite crystal relative to the center of the aluminosilicate zeolite crystal; or about 20% or more aluminum enrichment on the surface of the aluminosilicate zeolite crystal relative to the center of the aluminosilicate zeolite crystal; or about 25% or more aluminum enrichment on the surface of the aluminosilicate zeolite crystal relative to the center of the aluminosilicate zeolite crystal; or about 30% or more aluminum enrichment on the surface of the aluminosilicate zeolite crystal relative to the center of the aluminosilicate zeolite crystal.

Embodiment 11

The composition of any preceding embodiment, having a Si2p to Al2p ratio intensity gradient as a function of etch depth based on normalized Al2p and Si2p intensities from XPS after argon sputtering, wherein the Si2p to Al2p ratio intensity at 20 nm to 50 nm etch depth is up to about 10, wherein the Si2p to Al2p ratio intensity at 250 nm to 450 nm etch depth ranges from about 10 to about 15, and wherein the Si2p to Al2p ratio intensity at 1000 nm etch depth ranges from about 11.5 to about 20.

Embodiment 12

A process comprising: mixing a first amount of a first alumina source, a silica source, a mineralizing agent, and an organic structure directing agent to form a starting gel; crystallizing the starting gel in a pressure vessel under hydrothermal conditions for a first duration; and adding a second amount of a second alumina source to the pressure vessel over a second duration to form a final crystallization product. Note that the final crystallization product of this process can have, for example, any of the characteristics noted above for the composition of the invention.

Embodiment 13

The process of any preceding embodiment, wherein the first alumina source is the same as the second alumina source.

Embodiment 14

The process of any preceding embodiment, wherein the first alumina source and second alumina source are independently selected from the group consisting of $NaAlO_2$, $Al(C_3H_7O)_3$, Al metal, water-soluble aluminum salts, and combinations thereof.

Embodiment 15

The process of any preceding embodiment, wherein the second alumina source is a water soluble aluminum salt such as $NaAlO_2$.

Embodiment 16

The process of any preceding embodiment, wherein the silica source is selected from the group consisting of colloidal silica, fumed silica, tetraethyl orthosilicate (TEOS), sodium silicate, precipitated silica, and combinations thereof.

Embodiment 17

The process of any preceding embodiment, wherein the mineralizing agent is selected from the group consisting of NaOH, KOH, $F^-$, quaternary ammonium hydroxides, and combinations thereof.

Embodiment 18

The process of any preceding embodiment, wherein the organic structure directing agent comprises quaternary ammonium cations with substituents selected from the group consisting of alkyl, adamantyl, cyclohexyl, aromatic, and combinations thereof.

Embodiment 19

The process of any preceding embodiment, wherein aluminosilicate zeolite crystals resulting from the starting gel have a silica to alumina molar ratio ranging from about 5 to about 250, or about 10 to about 150, or about 10 to about 100, or about 15 to about 60.

Embodiment 20

The process of any preceding embodiment, wherein aluminosilicate zeolite crystals resulting from the starting gel have a uniform distribution of a silica to alumina molar ratio, and wherein aluminosilicate zeolite crystals resulting from a final crystallization product show a depth dependent silica to alumina molar ratio gradient.

Embodiment 21

The process of any preceding embodiment, wherein the aluminosilicate zeolite crystals resulting from the final crystallization product have a surface silica to alumina molar ratio and an internal silica to alumina molar ratio, and wherein the surface silica to alumina molar ratio is higher or lower than the internal silica to alumina molar ratio.

Embodiment 22

The process of any preceding embodiment, wherein the first duration defines a total crystallization time to obtain aluminosilicate zeolite crystals from the final crystallization product that are at least about 80% crystalline on a molar basis.

Embodiment 23

The process of any preceding embodiment, wherein the total crystallization time ranges from about 1 hour to about 168 hours, or about 1 hour to about 96 hours, or about 5 hours to about 72 hours, or about 10 hours to about 48 hours.

Embodiment 24

The process of any preceding embodiment, wherein the adding step begins about ¼, about ⅓, about ½, about ⅔, or about ¾ into the first duration.

Embodiment 25

The process of any preceding embodiment, wherein the second duration ranges from about 1 minute to about 168 hours, from about 1 minute to about 96 hours, from about 1 minute to about 72 hours, from about 1 minute to about 48 hours, or from about 1 minute to about 30 hours.

Embodiment 26

The process of any preceding embodiment, wherein the second duration ranges from about 1 minute to about 60 minutes, from about 1 minute to about 45 minutes, from about 1 minute to about 30 minutes, from about 1 minute to about 15 minutes, or from about 1 minute to about 10 minutes.

Embodiment 27

The process of any preceding embodiment, wherein the adding step comprises continuously adding the second amount of the second alumina source over the second duration, wherein the second duration is equal to the first duration, and wherein the second duration is run simultaneously with the first duration.

Embodiment 28

The process of any preceding embodiment, further comprising filtering, drying, and calcining aluminosilicate zeolite crystals resulting from the final crystallization product.

These and other features, aspects, and advantages of the disclosure will be apparent from a reading of the following detailed description together with the accompanying drawings, which are briefly described below. The present disclosure includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise.

BRIEF DESCRIPTION OF THE DRAWINGS

The above and other features of the present disclosure, their nature, and various advantages will become more apparent upon consideration of the following detailed description, taken in conjunction with the accompanying drawings, in which:

FIGS. 2A-2G depict elemental map images resulting from combined Scanning Electron Microscope (SEM) and Energy-Dispersive X-ray spectroscopy (EDX) analysis of aluminosilicate structures prepared in accordance with embodiments of the invention: (A) & (E) control—without mid-stage addition of a second alumina source; (B) upon addition of a second alumina source at 10 hours into the crystallization; (C) & (F) upon addition of a second alumina source at 15 hours into the crystallization; and (D) & (G) upon addition of a second alumina source at 20 hours into the crystallization.

FIGS. 3A-3C depict representative depth profiles, measured by X-ray Photoelectron Spectroscopy (XPS) with argon ion sputtering, of the aluminum concentration in the aluminosilicate zeolite crystals prepared according to embodiments of the invention: (A) control—without mid-stage addition of a second alumina source; (B) upon addition of a second alumina source at 15 hours into the crystallization; and (C) upon addition of a second alumina source at 20 hours into the crystallization.

DEFINITIONS AND MEASUREMENTS

Figure 1:
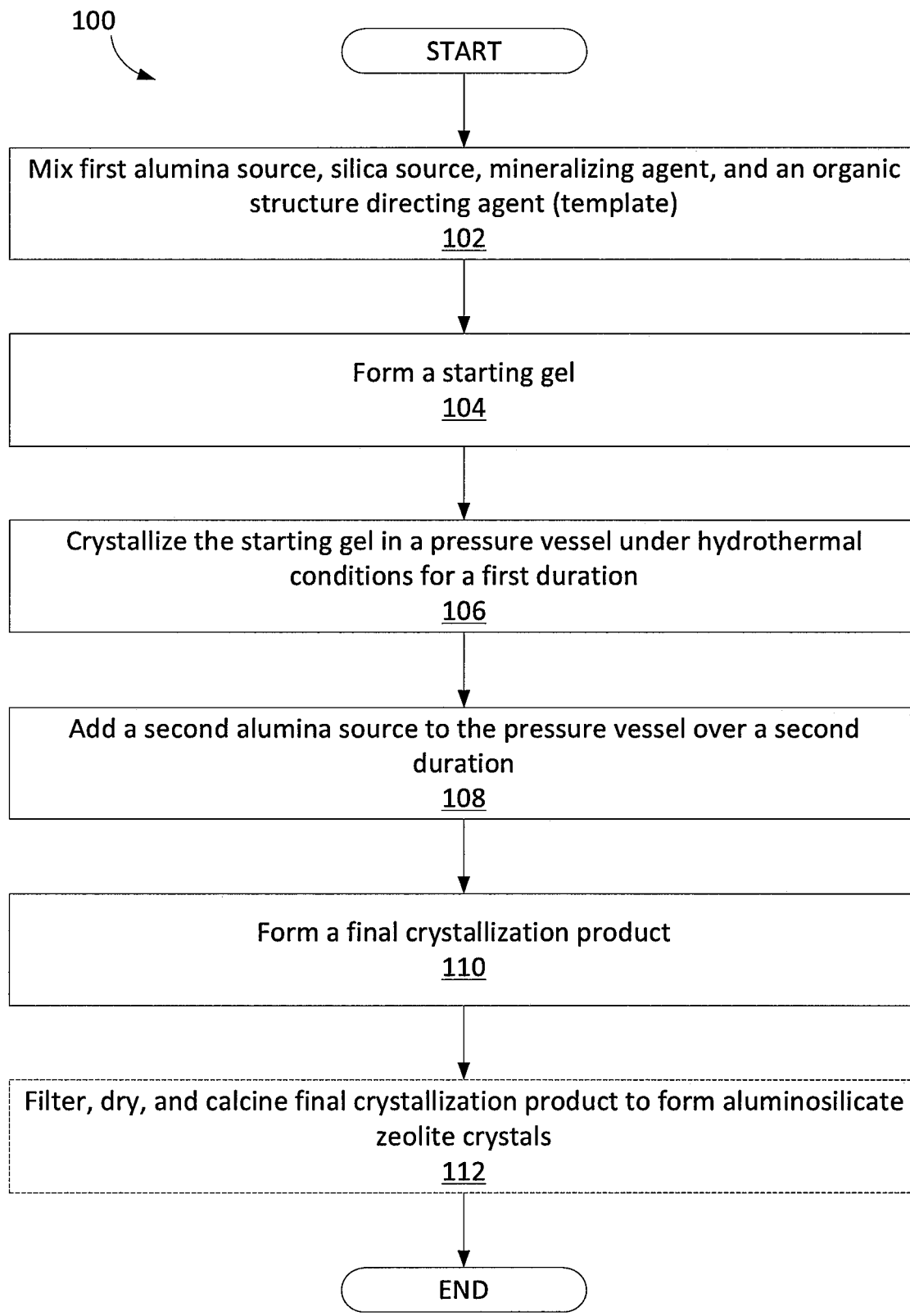
FIG. 1 illustrates a process for preparing aluminosilicate zeolite crystals according to an embodiment of the invention.

The term "surface silica to alumina molar ratio" refers to silica to alumina molar ratio derived from XPS with argon sputtering measurements of Si2p to Al2p intensity ratio measured at an etch depth of about 20 nm to about 50 nm.

The term "internal silica to alumina molar ratio" refers to silica to alumina molar ratio derived from XPS with argon sputtering measurements of Si2p to Al2p intensity ratio measured at an etch depth greater than about 250 nm.

The term "center silica to alumina molar ratio" refers to silica to alumina molar ratio derived from XPS with argon sputtering measurements of Si2p to Al2p intensity ratio measured at an etch depth of about 1000 nm.

Silicon to aluminum molar ratio may be measured by XPS and Argon sputtering. XPS measurements are performed using a K-alpha XPS system from ThermoFisher-SCIENTIFIC. The analysis chamber, with a base pressure below $1 \times 10^{-9}$ Torr, is equipped with a double-focusing hemispherical analyzer, an argon ion source for depth profiling, a combined low-energy electron/ion flood source for charge neutralization, and a monochromated Al K-α X-ray source. The beam size is 400 μm. For the depth profile measurements, the surface of each sample is sputtered using an argon sputtering gun at the rate of 0.1 nm/s that is rastered on a 2 mm×2 mm area. The argon sputtering gun is set at 3000 eV ion energy, $3 \times 10^{-7}$ Torr argon. Each sputtering cycle is set at 100 seconds, which gives sputtering amount of 10 nm/cycle. XPS spectra are measured at a constant pass energy of 40.0 eV using Al K-α radiation (h$\square$=1486.7 eV). The binding energies (BE's) are referenced to the adventitious C1s peak, 284.8 eV. The XPS analysis provides a normalized ratio of the signal associated with electron emissions associated with Si2p (binding energy=102.8 eV) and Al2p (binding energy=74.2 eV) core levels. Shirley background and mixed Gaussian-Lorentzian line shapes are used to fit the XPS spectra. Although these intensity ratios are indicative of the surface silicon to aluminum elemental ratio, they may not represent this absolute quantity accurately. However relative changes in Si2p/Al2p ratios from sample to sample or form surface to bulk (internal or center parts) on the same sample, do accurately reflect the changes in composition.

Elemental maps may be obtained through SEM and SEM/EDX. The zeolite is mixed into an epoxy resin then cured in a polyvinyl chloride powder holder. The holder is then ground and polished using diamond suspension revealing the zeolite embedded in epoxy. It is then coated with about 30 nm of carbon (about 4 nm of Pt for morphology samples). The backscatter electron images (BEI) and secondary electron images (SEI) were conducted on a JEOL (JSM 6500F or JSM 7800F) Schottky Field-Emission Scanning Electron Microscope (FE-SEM) equipped with dual Bruker Quantax SDD system (XFlash 5030 or 6160 series 30 mm$^2$–60 mm$^2$). Spectral resolution is 127 eV. SEI was conducted at 5 KeV; BEI was acquired at 10 KeV. The Energy Dispersive Spectrometry (EDS) analyses were conducted at a working distance of 10 mm and an accelerating voltage of 15 kV. Semi-quantitative analysis using system standards may vary between about 5% to about 10% with detector efficiency.

Composition crystallinity may be measured by X-ray Diffraction. The samples were ground using a mortar and pestle and then backpacked into a flat mount sample holder. A PANalytical MPD X'Pert Pro diffraction system was used for data collection. A copper anode tube (Wavelength: Cu K$\alpha$1=1.54060 Å) was operated at 45 kV and 40 mA. The Bragg-Brentano configuration was employed, and data was acquired from 3° to 80° 2θ with a step size of 0.016° and a count-time of 60 s/step. Phase identification and peak fitting was done using Jade Plus software version 9.5.0 and the PDF-4+2015 (powder diffraction file) database from the ICDD (International Center for Diffraction Data). Rietveld refinements were performed using Bruker AXS Topas software version 4.2.

Zeolite BET surface area analysis and nitrogen pore size distribution were analyzed on Micromeritics TriStar 3000 series instruments. The samples were degassed for a total of 6 hours (a 2 hour ramp up to 300° C. then held at 300° C. for 4 hours, under a flow of dry nitrogen) on a Micromeritics SmartPrep degasser. Nitrogen BET surface area is determined using 5 partial pressure points between 0.08 and 0.20. Nitrogen pore size (BJH) is determined using 33 desorption points.

Aluminosilicate zeolite crystal size may be estimated from SEM images.

DETAILED DESCRIPTION

The present disclosure relates to aluminosilicate zeolite crystals having a depth dependent silica to alumina molar ratio gradient and processes of their preparation. New catalyst compositions utilizing these aluminosilicate zeolite crystals are envisioned. Depending on the level of surface enrichment and the identity of the species that is enriched at the surface (i.e., either silica or alumina), certain performance characteristics can be altered. For example, although not bound by any particular theory of operation, embodiments wherein the amount of silica is enriched at the surface of the crystals (i.e., where the silica to alumina molar ratio is higher at the surface than in the interior of the crystal) may exhibit improved hydrothermal stability. In other embodiments, although not bound by any particular theory of operation, wherein the amount of alumina is enriched at the surface of the crystals (i.e., where the silica to alumina molar ratio is lower at the surface than in the interior of the crystal), the resulting composition may exhibit enhanced catalytic activity due to a greater concentration of catalytically active sites near the surface of the crystal, which improves mass transfer to the active sites.

Aluminosilicate Zeolite Crystal Composition

In some embodiments, the present disclosure is directed to a composition comprising an aluminosilicate zeolite crystal with an 8 ring pore size, the aluminosilicate zeolite crystal having a depth dependent silica to alumina molar ratio. In some embodiments, the aluminosilicate zeolite crystal has a surface silica to alumina molar ratio and an internal silica to alumina molar ratio, wherein the surface silica to alumina ratio is either higher or lower than the internal silica to alumina molar ratio. For example, the surface silica to alumina molar ratio may be at least about 50 times lower, at least about 40 times lower, at least about 30 times lower, at least about 20 times lower, at least about 10 times lower, at least about 5 times lower, at least about 4 times lower, at least about 3 times lower, at least about 2 times lower, or at least about 1.5 times lower, than the maximum value of the internal silica to alumina molar ratio. Conversely, the surface silica to alumina molar ratio could also be higher by the above-noted amounts as well. For the sake of clarity, it is noted that reference herein to a first ratio being "X times lower" than a second ratio can be restated as the first ratio being 1/X of the second ratio. For example, if the surface silica to alumina molar ratio is 50 times lower than the internal silica to alumina ratio, the surface silica to alumina molar ratio is 1/50 of the internal silica to alumina ratio.

In some embodiments, the composition may have a Si2p to Al2p ratio intensity gradient as a function of etch depth based on normalized Al2p and Si2p intensities from XPS after argon sputtering, wherein the Si2p to Al2p ratio intensity at 20 nm to 50 nm etch depth is up to about 10, wherein the Si2p to Al2p ratio intensity at 250 nm to 450 nm etch depth ranges from about 10 to about 15, and wherein the Si2p to Al2p ratio intensity at 1000 nm etch depth ranges from about 11.5 to about 20.

In some embodiments, the internal silica to alumina molar ratio may have a maximum value ranging from about 10 to about 250, from about 50 to about 250, from about 90 to about 250, from about 150 to about 250, or about 200.

In some embodiments, the surface silica to alumina molar ratio ranges from about 5 to about 60, from about 10 to about 50, from about 15 to about 40, from about 20 to about 40, or about 35.

In some embodiments, the composition has about 5% or more, about 10% or more, about 15% or more, about 20% or more, about 25% or more, or about 30% or more (on a molar basis) aluminum enrichment on a surface of the aluminosilicate zeolite crystal relative to the center of the aluminosilicate zeolite crystal.

In some embodiments, the composition may be about 80% or more, about 85% or more, or about 90% or more crystalline, on a molar basis. In certain embodiments, the composition may be about 80% to about 95% crystalline or about 82% to about 92% crystalline.

In some embodiments, the composition may have a zeolitic BET surface area of about 400 m$^2$/g or more, or about 450 m$^2$/g or more. In certain embodiments, the composition may have a zeolitic BET surface area ranging from about 400 m$^2$/g to about 900 m$^2$/g, from about 450 m$^2$/g to about 900 m$^2$/g, from about 400 m$^2$/g to about 750 m$^2$/g, from about 450 m$^2$/g to about 750 m$^2$/g, from about 400 m$^2$/g to about 600 m$^2$/g, or from about 450 m$^2$/g to about 550 m$^2$/g.

In some embodiments, the composition may have a crystal size of up to about 10 µm, or ranging from about 0.1 µm to about 10 µm, from about 0.1 µm to about 8 µm, from about 0.1 µm to about 6 µm, from about 0.1 µm to about 5

μm, from about 0.1 μm to about 4 μm, from about 0.1 μm to about 3 μm, from about 0.1 μm to about 2 μm, from about 0.1 μm to about 1 μm, from about 0.1 μm to about 0.5 μm, from about 1 μm to about 10 μm, from about 1 μm to about 8 μm, from about 1 μm to about 6 μm, from about 1 μm to about 5 μm, from about 1 μm to about 4 μm, from about 1 μm to about 3 μm, or from about 1 μm to about 2 μm.

In some embodiments, the various aluminosilicate zeolite crystal compositions described herein comprise structural codes selected from the group consisting of AEI, AFX, CHA, LEV, AFT, EAB, KFI, SAT, TSC, SAV, ERI, and combinations thereof. In one embodiment, the aluminosilicate zeolite crystal comprises CHA.

Process for Preparing an Aluminosilicate Zeolite Crystal Composition

In some embodiments, the process 100 for preparing the aluminosilicate zeolite crystal composition disclosed in FIG. 1, comprises mixing a first amount of a first alumina source, a silica source, a mineralizing agent, and an organic structure directing agent (template), in accordance with block 102, to form a starting gel, in accordance with block 104. The process may further comprise crystallizing the starting gel in a stirred pressure vessel at temperatures of above 100° C. and autogenous pressure for a first duration, in accordance with block 106. The process may further comprise adding a second amount of a second alumina source, for example, as a neat solution via an HPLC pump, to the stirred pressure vessel over a second duration, in accordance with block 108, to form a final crystallization product, in accordance with block 110.

In some embodiments, the first duration defines the total crystallization time to obtain aluminosilicate zeolite crystals from the final crystallization product that are at least about 80% crystalline. In some embodiments, the aluminosilicate zeolite crystals resulting from the final crystallization product may be about 80% to about 95% crystalline or about 82% to about 92% crystalline. The total crystallization time may range from about 1 hour to about 168 hours, from about 1 hour to about 96 hours, from about 5 hour to about 72 hours, from about 10 hour to about 48 hours, or about 30 hours.

Although the above-described process is directed to embodiments where surface enrichment of alumina is desired (i.e., where the surface silica to alumina molar ratio is lower than the internal silica to alumina molar ratio), the process could be readily adapted to achieve the converse result (higher surface silica to alumina molar ratio) by substituting a second silica source for the second alumina source in the description above.

In some embodiments, the adding step begins about ¼, about ⅓, about ½, about ⅔, or about ¾ into the first duration. For example, if the first duration is about 30 hours, the adding step may begin at about 7.5 hours (¼ into the first duration), at about 10 hours (⅓ into the first duration), at about 15 hours (½ into the first duration), at about 20 hours (⅔ into the first duration), or at about 22.5 hours (¾ into the first duration). In other embodiments, the adding step may begin at other time points during the first duration. In certain embodiments, the adding step may begin simultaneously with the start of the first duration (i.e. the crystallizing and adding step may begin at the same time). In advantageous embodiments, the adding step begins after crystal nucleation within the starting gel has already commenced in order to avoid disruption of the crystallization process. The precise starting point of nucleation will vary depending on the identity of the starting materials and the crystallization parameters utilized, but can be determined with routine experimentation as set forth in the examples.

The second duration may range from about 1 minute to about 168 hours, from about 1 minute to about 96 hours, from about 1 minute to about 72 hours, from about 1 minute to about 48 hours, from about 1 minute to about 30 hours, from about 1 minute to about 60 minutes, from about 1 minute to about 45 minutes, from about 1 minute to about 30 minutes, from about 1 minute to about 15 minutes, or from about 1 minute to about 10 minutes.

In some embodiments, the second duration may be equal to the first duration, the second duration may run simultaneously with the first duration, and the second amount of the second alumina source may be added continuously throughout the second duration. In some embodiments, the second amount of the second alumina source may be added at a gradually increasing addition rate throughout the second duration. For example, the first and second duration may both be 30 hours and may run simultaneously such that throughout the 30 hours the amount of extra aluminum added can be up to about 50% of that the amount found in the starting gel. In certain embodiments, the extra aluminum added may be added at a gradually increasing flow rate. The resulting product is in the form of aluminosilicate zeolite crystals with a depth dependent silica to alumina molar ratio (i.e., aluminum gradient). The amount of alumina added as the second amount of alumina source noted above can vary considerably as a percentage of total alumina used during the process, such as anywhere from about 1% to essentially 100% (e.g., about 20 to about 95%) of the total alumina used in the process.

Returning to FIG. 1, in some embodiments, process 100 may further optionally comprise filtering and/or drying and/or calcining the aluminosilicate zeolite crystals resulting from the final crystallization product, in accordance with block 112.

In some embodiments, the first alumina source may be the same as the second alumina source. In other embodiments, the first alumina source may be different from the second alumina source. The first and second alumina sources may be independently selected from the group consisting of $NaAlO_2$, $Al(C_3H_7O)_3$, Al metal, water-soluble aluminum salts, and combinations thereof.

The silica source may be selected from the group consisting of colloidal silica, fumed silica, and tetraethyl orthosilicate (TEOS), sodium silicate, precipitated silica, and combinations thereof.

The mineralizing agent may be selected from the group consisting of NaOH, KOH, and $F^-$, quaternary ammonium hydroxides, and combinations thereof.

The organic structure directing agent (template) may be selected from the group consisting of quaternary ammonium salts. Examples include quaternary ammonium cations with substituents selected from the group consisting of alkyl, adamantyl, cyclohexyl, aromatic, and combinations thereof.

In some embodiments, aluminosilicate zeolite crystals resulting from the starting gel have a uniform distribution of a silica to alumina molar ratio, while aluminosilicate zeolite crystals resulting from the final crystallization product show a depth dependent silica to alumina molar ratio gradient. For example, the aluminosilicate zeolite crystals resulting from the starting gel may have a silica to alumina molar ratio ranging from about 5 to about 250, from about 10 to about 150, from about 10 to about 100, from about 15 to about 60, or about 56.

The aluminosilicate zeolite crystals resulting from the final crystallization product may have a surface silica to alumina molar ratio and an internal silica to alumina molar ratio. The surface silica to alumina molar ratio may be lower than the internal silica to alumina molar ratio. For example, the surface silica to alumina molar ratio of the aluminosilicate zeolite crystals resulting from the final crystallization product may be at least about 50 times lower, at least about 40 times lower, at least about 30 times lower, at least about 20 times lower, at least about 10 times lower, at least about 5 times lower, at least about 4 times lower, at least about 3 times lower, at least about 2 times lower, or at least about 1.5 times lower than the maximum value of the internal silica to alumina molar ratio of the aluminosilicate zeolite crystals resulting from the final crystallization product.

In some embodiments, the aluminosilicate zeolite crystals resulting from the final crystallization product may have Si2P to Al2P ratio intensity gradient as a function of etch depth based on normalized Al 2p and Si 2p intensities from XPS after argon sputtering, wherein the Si2P to Al2P ratio intensity at 20 nm to 50 nm etch depth is up to about 10, wherein the Si2P to Al2P ratio intensity at 250 nm to 450 nm etch depth ranges from about 10 to about 15, and wherein the Si2P to Al2P ratio intensity at 1000 nm etch depth ranges from about 11.5 to about 20.

In some embodiments, the internal silica to alumina molar ratio of the aluminosilicate zeolite crystals resulting from the final crystallization product have a maximum value ranging from about 10 to about 250, from about 50 to about 250, from about 90 to about 250, from about 150 to about 250, or about 200.

In some embodiments, the surface silica to alumina molar ratio of the aluminosilicate zeolite crystals resulting from the final crystallization product ranges from about 5 to about 60, from about 10 to about 50, from about 15 to about 40, from about 20 to about 40, or about 35.

In some embodiments, the aluminosilicate zeolite crystals resulting from the final crystallization product have about 5% or more, about 10% or more, about 15% or more, about 20% or more, about 25% or more, or about 30% or more aluminum enrichment on the surface of the aluminosilicate zeolite crystals relative to the center of the aluminosilicate zeolite crystals.

In some embodiments, the aluminosilicate zeolite crystals resulting from the final crystallization product may have a zeolitic BET surface area of about 400 m$^2$/g or more, about 450 m$^2$/g or more. In certain embodiments, the composition may have a zeolitic BET surface area ranging from about 400 m$^2$/g to about 900 m$^2$/g, from about 450 m$^2$/g to about 900 m$^2$/g, from about 400 m$^2$/g to about 750 m$^2$/g, from about 450 m$^2$/g to about 750 m$^2$/g, from about 400 m$^2$/g to about 600 m$^2$/g, or from about 450 m$^2$/g to about 550 m$^2$/g.

In some embodiments, the aluminosilicate zeolite crystals resulting from the final crystallization product may have a crystal size of up to about 10 μm, or ranging from about 0.1 μm to about 10 μm, from about 0.1 μm to about 8 μm, from about 0.1 μm to about 6 μm, from about 0.1 μm to about 5 μm, from about 0.1 μm to about 4 μm, from about 0.1 μm to about 3 μm, from about 0.1 μm to about 2 μm, from about 0.1 μm to about 1 μm, from about 0.1 μm to about 0.5 μm, from about 1 μm to about 10 μm, from about 1 μm to about 8 μm, from about 1 μm to about 6 μm, from about 1 μm to about 5 μm, from about 1 μm to about 4 μm, from about 1 μm to about 3 μm, or from about 1 μm to about 2 μm.

EXAMPLES

The following examples are set forth to assist in understanding the embodiments described herein and should not be construed as specifically limiting the embodiments described and claimed herein. Such variations, including the substitution of all equivalents now known or later developed, which would be within the purview of those skilled in the art, and changes in formulation or minor changes in experimental design, are to be considered to fall within the scope of the embodiments incorporated herein. Although the examples are directed to embodiments where surface enrichment of alumina is desired (i.e., where the surface silica to alumina molar ratio is lower than the internal silica to alumina molar ratio), the process could be readily adapted to achieve the converse result (higher surface silica to alumina molar ratio) by substituting a second silica source for the second alumina source in the examples below.

Example 1: Control—Without Mid-Stage Addition of a Second Alumina Source

A starting aluminosilicate gel with a nominal silica to alumina ratio (SAR) of 56 was prepared by the following procedure. First, 1.78 g of 50 wt % aqueous NaOH solution, 65.9 g of deionized water, 1.62 g of aluminum isopropoxide, and 13.5 g of 25 wt % aqueous solution of trimethyladamantylammonium hydroxide were combined and stirred for 1 hour at 25° C. To this mixture 33.1 g of 40 wt. % colloidal silica were added, and the resulting gel was stirred for an addition 30 minutes before loading into a 600 mL stirred autoclave reactor. The gel was crystalized at 160° C. under autogenous pressure for 30 hours (with an 8 hour temperature ramp). After cooling to room temperature, the crystalline material was filtered, washed with deionized water, dried (for 12 hours at 90° C.) and calcined (for 6 hours at 540° C.) to obtain the zeolite product. The X-ray diffraction pattern of the product showed CHA (87% crystallinity) and an amorphous phase. The actual SAR, determined through elemental analysis was 48.7.

The resulting SEM and SEM/EDX images are depicted in FIGS. 2A and 2E which illustrate uniform distribution of aluminum throughout the aluminosilicate zeolite crystals. FIG. 3A, depicting a representative depth profile of the aluminum concentration in the aluminosilicate zeolite crystal prepared according to Example 1, further supports the observation of uniform aluminum distribution at varying aluminosilicate zeolite crystal depth. FIG. 3A shows little variation in aluminum concentration from the surface of the aluminosilicate zeolite crystal to the internal part of the aluminosilicate zeolite crystal, e.g., 8% variation in aluminum to silicon intensity ratio. Alumina concentration can be estimated based on the brightness or intensity of the XPS image. As shown in FIG. 3A, the brightness of the image is relatively uniform across the etch depth, which suggests a relatively uniform distribution of aluminum.

Example 2: Upon Addition of a Second Alumina Source at 15 Hours into the Crystallization During the crystallization of the gel prepared in Example 1, 7.76 ml of an 11.7% aqueous solution of sodium aluminate (USALCO 38 20% Al$_2$O$_3$, 19% Na$_2$O) was injected into the autoclave via an HPLC pump. The injection was carried out at a flow rate of 2 ml/min, 15 hours after the start of the isothermal crystallization period. The product was isolated as in Example 1. The X-ray diffraction pattern of the product showed CHA (82% crystallinity) and an amorphous phase. The actual SAR, through elemental analysis was 36.3.

The resulting SEM and SEM/EDX images are depicted in FIGS. 2C and 2F which illustrate aluminum enrichment on the surface of the aluminosilicate zeolite crystals. FIG. 3B, depicting a representative depth profile of the aluminum concentration in the aluminosilicate zeolite crystal prepared according to Example 2, further supports the observation of a strong aluminum gradient, extending at least 450 nm below the surface of the aluminosilicate zeolite crystals. FIG. 3B illustrates a surface aluminum enrichment of 43% in relation to the internal aluminum concentration. The enrichment of aluminum at the surface is evidenced by the brightness of the image at the surface region of FIG. 3B.

Example 3: Upon Addition of a Second Alumina Source at 20 Hours into the Crystallization The crystallization and sodium aluminate injection were performed similar to Example 2, except that the injection occurred 20 hours after the start of the isothermal crystallization period. The product was isolated as in Examples 1 and 2. The X-ray diffraction pattern of the product showed CHA (92% crystallinity) and an amorphous phase. The actual SAR, through elemental analysis was 39.7.

The resulting SEM and SEM/EDX images are depicted in FIGS. 2D and 2G which show the presence of a segregated aluminum phase on the surface of the aluminosilicate zeolite crystals. FIG. 3C, depicting a representative depth profile of the aluminum concentration in the aluminosilicate zeolite crystal prepared according to Example 3, illustrates a more superficial aluminum enrichment on the surface, present only in the first 100 nm below the surface with the subsurface and internal composition being similar to that of FIG. 3A. The enrichment of aluminum at the surface is evidenced by the brightness of the image at the surface region of FIG. 3C. Without being bound by this observation, the results of Example 3 suggest segregation of an aluminum rich phase from the aluminosilicate zeolite crystals.

Quantitative Si2p to Al2p intensity ratio at various etch depths for the aluminosilicate zeolite crystals of Examples 1-3 are summarized in the table below.

| | Si/Al intensity ratio at etch depth (nm) | | |
|---|---|---|---|
| Example | 20-50 (nm) | 250-450 (nm) | 1000 (nm) |
| 1 | 17.8 | 17.1 | 16.3 |
| 2 | 8.4 | 10.5 | 11.8 |
| 3 | 7.0 | 14.0 | 16.6 |

Example 4: Upon Addition of a Second Alumina Source at 10 Hours into the Crystallization The crystallization and sodium aluminate injection were performed similar to Examples 2 and 3, except that the injection occurred 10 hours after the start of the isothermal crystallization period. The product was isolated as in Examples 1-3. Early addition of the second alumina source interfered with the crystallization process and resulted in an amorphous aluminosilicate product as illustrated in FIG. 2B. Although not bound by any particular theory of operation, it is believed that the addition of the second alumina source occurred during crystal nucleation, which disrupted crystallization of the zeolite material.

The use of the terms "a," "an," "the," and similar referents in the context of describing the materials and methods discussed herein (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

Reference throughout this specification to "one embodiment," "certain embodiments," "one or more embodiments" or "an embodiment" means that a particular feature, structure, material, or characteristic described in connection with the embodiment is included in at least one embodiment of the present disclosure. Thus, the appearances of the phrases such as "in one or more embodiments," "in certain embodiments," "in some embodiments," "in one embodiment," or "in an embodiment" in various places throughout this specification are not necessarily referring to the same embodiment of the present disclosure. Furthermore, the particular features, structures, materials, or characteristics may be combined in any suitable manner in one or more embodiments.

Although the embodiments disclosed herein have been described with reference to particular embodiments it is to be understood that these embodiments are merely illustrative of the principles and applications of the present disclosure. It will be apparent to those skilled in the art that various modifications and variations can be made to the method and apparatus of the present disclosure without departing from the spirit and scope of the disclosure. Thus, it is intended that the present disclosure include modifications and variations that are within the scope of the appended claims and their equivalents, and the above-described embodiments are presented for purposes of illustration and not of limitation.

What is claimed is:

1. A composition comprising:
   an aluminosilicate zeolite crystal with an 8 ring pore size, the aluminosilicate zeolite crystal having a surface silica to alumina molar ratio and an internal silica to alumina molar ratio, wherein the surface silica to alumina molar ratio is either higher or lower than the internal silica to alumina molar ratio.

2. The composition of claim 1, wherein the aluminosilicate zeolite crystal comprises structural codes selected from the group consisting of AEI, AFX, CHA, LEV, AFT, EAB, KFI, SAT, TSC, SAV, ERI, and combinations thereof.

3. The composition of claim 1, wherein the aluminosilicate zeolite crystal comprises CHA.

4. The composition of claim 1, wherein the composition is about 80% or more crystalline on a molar basis.

5. The composition of claim 4, wherein the composition is about 80% to about 95% crystalline on a molar basis.

6. The composition of claim 1, wherein the composition has a zeolitic BET surface area of about 400 m$^2$/g or more.

7. The composition of claim 1, wherein the surface silica to alumina molar ratio is at least about 1.5 times higher or lower than the maximum value of the internal silica to alumina molar ratio.

8. The composition of claim 1, wherein the internal silica to alumina molar ratio has a maximum value ranging from about 10 to about 250.

9. The composition of claim 1, wherein the surface silica to alumina molar ratio ranges from about 5 to about 60.

10. The composition of claim 1, wherein the composition has, on a molar basis, about 5% or more aluminum enrichment on a surface of the aluminosilicate zeolite crystal relative to the center of the aluminosilicate zeolite crystal.

11. The composition of claim 1, having a Si2p to Al2p ratio intensity gradient as a function of etch depth based on normalized Al2p and Si2p intensities from XPS after argon sputtering, wherein the Si2p to Al2p ratio intensity at 20 nm to 50 nm etch depth is up to about 10, wherein the Si2p to Al2p ratio intensity at 250 nm to 450 nm etch depth ranges from about 10 to about 15, and wherein the Si2p to Al2p ratio intensity at 1000 nm etch depth ranges from about 11.5 to about 20.

12. A process comprising:
mixing a first amount of a first alumina source, a silica source, a mineralizing agent, and an organic structure directing agent to form a starting gel;
crystallizing the starting gel in a pressure vessel under hydrothermal conditions for a first duration; and
adding a second amount of a second alumina source to the pressure vessel over a second duration to form a final crystallization product;
wherein the final crystallization product comprises an aluminosilicate zeolite crystal with an 8 ring pore size, the aluminosilicate zeolite crystal having a surface silica to alumina molar ratio and an internal silica to alumina molar ratio, and wherein the surface silica to alumina molar ratio is either higher or lower than the internal silica to alumina molar ratio.

13. The process of claim 12, wherein the first alumina source is the same as the second alumina source.

14. The process of claim 12, wherein the first alumina source and second alumina source are independently selected from the group consisting of Al metal, water-soluble aluminum salts, and combinations thereof.

15. The process of claim 12, wherein the second alumina source is $NaAlO_2$ or $Al(C_3H_7O)_3$.

16. The process of claim 12, wherein the silica source is selected from the group consisting of colloidal silica, fumed silica, tetraethyl orthosilicate (TEOS), sodium silicate, precipitated silica, and combinations thereof.

17. The process of claim 12, wherein the mineralizing agent is selected from the group consisting of NaOH, KOH, $F^-$, quaternary ammonium hydroxides, and combinations thereof.

18. The process of claim 12, wherein the organic structure directing agent comprises quaternary ammonium cations with substituents selected from the group consisting of alkyl, adamantyl, cyclohexyl, aromatic, and combinations thereof.

19. The process of claim 12, wherein aluminosilicate zeolite crystals resulting from the starting gel have a silica to alumina molar ratio ranging from about 5 to about 250.

20. The process of claim 12, wherein aluminosilicate zeolite crystals resulting from the starting gel have a uniform distribution of a silica to alumina molar ratio.

21. The process of claim 12, wherein the first duration defines a total crystallization time to obtain aluminosilicate zeolite crystals from the final crystallization product that are at least about 80% crystalline on a molar basis.

22. The process of claim 21, wherein the total crystallization time ranges from about 1 hour to about 168 hours.

23. The process of claim 21, wherein the adding step begins about ¼ to about ¾ into the first duration.

24. The process of claim 12, wherein the second duration ranges from about 1 minute to about 168 hours.

25. The process of claim 12, wherein the second duration ranges from about 1 minute to about 60 minutes.

26. The process of claim 12, wherein the adding step comprises continuously adding the second amount of the second alumina source over the second duration,
wherein the second duration is equal to the first duration.

27. The process of claim 12, further comprising filtering, drying, and calcining aluminosilicate zeolite crystals resulting from the final crystallization product.

28. The composition of claim 1, wherein the surface silica to alumina molar ratio is at least about 5 times higher or lower than the maximum value of the internal silica to alumina molar ratio.

29. The composition of claim 1, wherein the surface silica to alumina molar ratio is at least about 10 times higher or lower than the maximum value of the internal silica to alumina molar ratio.

30. The composition of claim 1, wherein the surface silica to alumina molar ratio is at least about 30 times higher or lower than the maximum value of the internal silica to alumina molar ratio.

31. The composition of claim 1, wherein the surface silica to alumina molar ratio is at least about 50 times higher or lower than the maximum value of the internal silica to alumina molar ratio.

32. The composition of claim 1, wherein the internal silica to alumina molar ratio has a maximum value ranging from about 50 to about 250.

33. The composition of claim 1, wherein the internal silica to alumina molar ratio has a maximum value ranging from about 90 to about 250.

34. The composition of claim 1, wherein the internal silica to alumina molar ratio has a maximum value ranging from about 150 to about 250.

35. The composition of claim 1, wherein the surface silica to alumina molar ratio ranges from about 10 to about 50.

36. The composition of claim 1, wherein the surface silica to alumina molar ratio ranges from about 15 to about 40.

37. The composition of claim 1, wherein the surface silica to alumina molar ratio ranges about 20 to about 40.

38. The composition of claim 1, wherein the composition has, on a molar basis, about 10% or more aluminum enrichment on the surface of the aluminosilicate zeolite crystal relative to the center of the aluminosilicate zeolite crystal.

39. The composition of claim 1, wherein the composition has, on a molar basis, about 15% or more aluminum enrichment on the surface of the aluminosilicate zeolite crystal relative to the center of the aluminosilicate zeolite crystal.

40. The composition of claim 1, wherein the composition has, on a molar basis, about 20% or more aluminum enrichment on the surface of the aluminosilicate zeolite crystal relative to the center of the aluminosilicate zeolite crystal.

41. The composition of claim 1, wherein the composition has, on a molar basis, about 25% or more aluminum enrichment on the surface of the aluminosilicate zeolite crystal relative to the center of the aluminosilicate zeolite crystal.

42. The composition of claim 1, wherein the composition has, on a molar basis, about 30% or more aluminum enrichment on the surface of the aluminosilicate zeolite crystal relative to the center of the aluminosilicate zeolite crystal.

* * * * *